No. 742,469. PATENTED OCT. 27, 1903.
C. H. MEYER.
PROCESS OF MAKING SOLUBLE STARCH.
APPLICATION FILED JAN. 17, 1902.
NO MODEL.
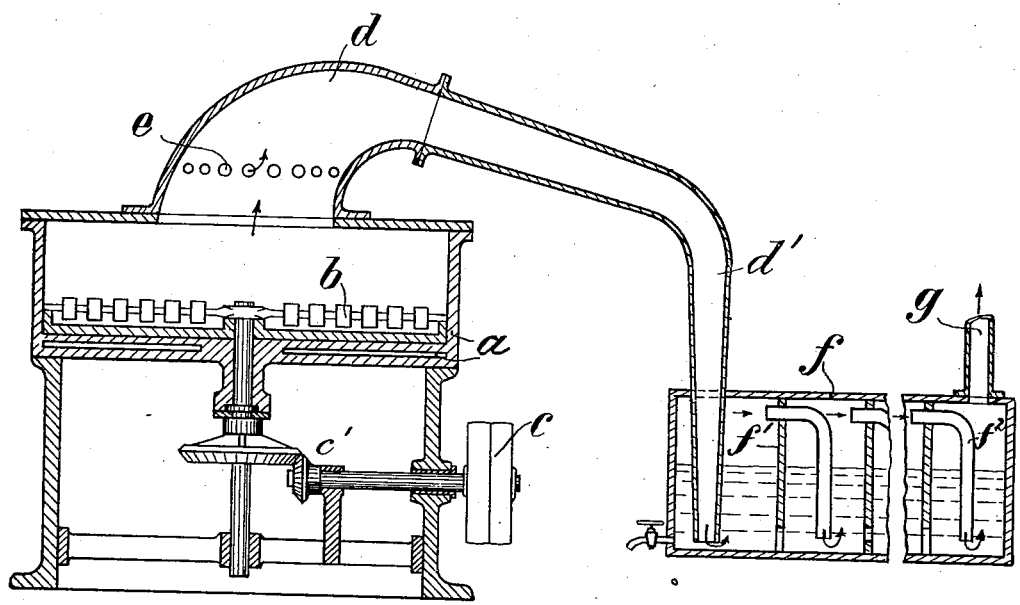
WITNESSES:
John Lotka
John A. Kehlenbeck
INVENTOR
Carl H. Meyer
BY Briesen & Knauth
ATTORNEYS No. 742,469.

Patented October 27, 1903.

UNITED STATES PATENT OFFICE.

CARL HEINRICH MEYER, OF ZWICKAU, GERMANY, ASSIGNOR TO LOUIS BLUMER, OF ZWICKAU, SAXONY, GERMANY.

PROCESS OF MAKING SOLUBLE STARCH.

SPECIFICATION forming part of Letters Patent No. 742,469, dated October 27, 1903.

Application filed January 17, 1902. Serial No. 90,123. (No specimens.)

*To all whom it may concern:*

Be it known that I, CARL HEINRICH MEYER, chemist, residing at Leipzigerstrasse 75, Zwickau, in the Kingdom of Saxony, German Empire, have invented new and useful Improvements in Processes of Manufacturing Soluble Starch, of which the following is a specification.

This invention relates to a process for converting starch into its modification soluble in hot water of 160° to 200° Fahrenheit, by treating it with acids, and more particularly with organic acids, and has for its object to obtain a soluble starch free of by-products, and, furthermore, to recover the acid employed by treating the starch with a volatile organic acid—as, for instance, formic acid, acetic acid, or the like.

My invention consists in a novel process by the use of which soluble starch may be produced in a much shorter time than hitherto and by which a product of great purity is obtained, while the acid used for converting the starch into its soluble modification is recovered, so that it can be used over again.

The accompanying drawing illustrates in cross-section an apparatus suitable for carrying out my process.

*a* is a jacketed boiler having a stirrer *b*, to which rotation is imparted from the pulley *c* through suitable intermediate mechanism *c'*.

*d* is a distilling-dome provided with airholes *e*.

*f* is an absorber partly filled with water and provided with a series of partitions *f'* and with tubes *f²*, which lead from the upper space of one compartment to the water-space of the next compartment.

*d'* is a tube connecting the distilling-dome *d* with the absorber, and *g* is a suction-tube connected with a suitable suction device, such as an air-pump.

In carrying out my invention I proceed as follows: The starch to be treated is brought into the boiler *a*, and an aqueous solution of about ten per cent. of a volatile organic acid—as, for instance, formic acid or acetic acid—is added. The amount of solution should be such that the weight of acid proper will be one per cent. of the weight of the starch. As the temperature rises slowly the starch swells and the temperature should be increased gradually to from 200° to 215° Fahrenheit, at which point it should be maintained about two hours. During this period steam and acid vapors rise from the starch and pass into the absorber or condenser *f*, where they are recovered to form a solution which may be used for a subsequent operation. Then the temperature is raised to about 240° Fahrenheit and kept at this point for about four hours. The transformation of the starch is then completed by continuous stirring, and to determine whether the operation is completed a sample of the product obtained is mixed with water and heated to about 140° to 160° Fahrenheit. This should produce a clear solution of rather heavy consistency, which when treated with a solution of iodin will exhibit the well-known reaction of starch.

If good commercial starch is employed and by using formic acid as a reagent, a clear white product is obtained, which is of greater purity than the soluble starch generally manufactured.

The entire operation, as will be seen from the description given, takes no more than six to seven hours, and thus it effects a considerable saving of time as compared with the processes now employed.

I claim as my invention—

1. The process of converting starch into its soluble modification, which consists in heating the starch, in the presence of a small amount (about one per cent.) of a volatile organic acid, to from 200° to 215° Fahrenheit, removing the acid-vapors by distillation, and continuing to heat the remaining product to about 240° Fahrenheit.

2. The process of converting starch into its soluble modification, which consists in heating the starch in the presence of a small amount (about one per cent.) of a volatile organic acid, and gradually increasing the temperature to 240° Fahrenheit.

In testimony whereof I have signed my name to this specification in the presence of two subscribing witnesses.

CARL HEINRICH MEYER.

Witnesses:
 PAUL OTTO SCHUMACHER,
 RUDOLF WILHELM MÖLLER.